United States Patent [19]

Akagiri

[11] Patent Number: 5,642,111
[45] Date of Patent: Jun. 24, 1997

[54] HIGH EFFICIENCY ENCODING OR DECODING METHOD AND DEVICE

[75] Inventor: Kenzo Akagiri, Kanagawa, Japan

[73] Assignee: Sony Corporation, Tokyo, Japan

[21] Appl. No.: 184,471

[22] Filed: Jan. 19, 1994

[30] Foreign Application Priority Data

Feb. 2, 1993 [JP] Japan ................................. 5-015492

[51] Int. Cl.$^6$ .............................. H04B 1/66; H03M 7/38
[52] U.S. Cl. ............................................ 341/50; 395/2.38
[58] Field of Search ..................... 341/50, 51; 395/2.38; 381/30, 37, 29, 34

[56] References Cited

U.S. PATENT DOCUMENTS

| | | |
|---|---|---|
| 3,349,183 | 10/1967 | Campanella. |
| 4,184,049 | 1/1980 | Crochiere et al. ...................... 179/1 SA |
| 4,455,649 | 6/1984 | Esteban et al. ............................. 370/80 |
| 4,516,241 | 5/1985 | Farah et al. ........................... 370/110.1 |
| 4,535,472 | 8/1985 | Tomcik ....................................... 381/31 |
| 4,569,058 | 2/1986 | Grallert ....................................... 375/27 |
| 4,573,187 | 2/1986 | Bui et al. ................................... 381/43 |
| 4,622,598 | 11/1986 | Doi et al. .................................. 360/22 |
| 4,625,286 | 11/1986 | Papamichalis et al. ............... 364/513.5 |
| 4,697,212 | 9/1987 | Osawa et al. ............................... 360/48 |
| 4,706,265 | 11/1987 | Furukawa .................................. 375/122 |
| 4,713,776 | 12/1987 | Araseki .................................. 364/513.5 |
| 4,748,579 | 5/1988 | Zibman et al. .......................... 364/736 |
| 4,873,589 | 10/1989 | Inazawa et al. ........................... 360/53 |

(List continued on next page.)

FOREIGN PATENT DOCUMENTS

| | | | |
|---|---|---|---|
| 0 349 325 A2 | 1/1990 | European Pat. Off. | ......... G11B 20/10 |
| 370277 | 5/1990 | European Pat. Off. | .......... H04B 1/66 |
| 0 423 050 A1 | 4/1991 | European Pat. Off. | .......... H04B 1/66 |
| 0 424 016 A2 | 4/1991 | European Pat. Off. | .......... H04B 1/66 |
| 0428156 | 5/1991 | European Pat. Off. | .......... H03M 7/30 |
| 0 446 031 A3 | 9/1991 | European Pat. Off. | .......... H04B 1/66 |

(List continued on next page.)

OTHER PUBLICATIONS

Polyphase Quadrature Filters—A New Subband Coding Technique Rothweiber IC ASSP 1983, Boston vol. 3 pp. 1280–1283.

Critical Band Coder—Digital Encoding of Speech Signals Basen on the Perceptual Requirements of The Auditory System Krasner IEEE vol. 1–3 pp. 327–331.

Linear Prediction with a Variable Analysis Frame Size, Ghandra et al IEEE Transactions on Acoustics Speech & Signals vol. ASSP–25 #4 Oct. 1977.

(List continued on next page.)

*Primary Examiner*—Jeffrey A. Gaffin
*Assistant Examiner*—Peguy JeanPierre
*Attorney, Agent, or Firm*—Limbach & Limbach, L.L.P.

[57] ABSTRACT

A high efficiency encoding method in which pre-set bit allocation is made for digital information signals of plural channels and in which coded information signals are produced by the allocated bits. It is desirable in this type of the high efficiency encoding method to avoid sound quality deterioration produced by pre-echo during abrupt changes in the information signals as well as to suppress the pre-echo to assure aurally desirable bit allocation. To this end, in the high efficiency encoding method, in which digital information signals of plural channels are normalized by normalizing units and pre-set bit allocation is made by a bit allocation unit to effect pre-set bit allocation. The amounts of bit allocation between channels are controlled on the basis of temporal changes of the information signals of the respective channels. Besides, the amounts of bit allocation between channels are controlled based on temporal changes of the amplitude information of digital information signals of the respective channels. At least a part of the bits that may be used for bit allocation is preferentially allocated for channels having larger temporal changes of the information signals depending on the magnitude of temporal changes of the information signals among the plural channels. As a result, deterioration in the sound quality due to pre-echo during high efficiency encoding may be prevented in a system having plural audio signal channels.

20 Claims, 11 Drawing Sheets

U.S. PATENT DOCUMENTS

| | | | |
|---|---|---|---|
| 4,882,754 | 11/1989 | Weaver et al. | 381/35 |
| 4,885,790 | 12/1989 | McAulay | 381/36 |
| 4,903,301 | 2/1990 | Kondo et al. | 381/30 |
| 4,912,763 | 3/1990 | Galand et al. | 381/31 |
| 4,932,062 | 6/1990 | Hamilton | 381/43 |
| 4,949,383 | 8/1990 | Koh | 381/31 |
| 4,964,166 | 10/1990 | Wilson | 381/34 |
| 5,016,107 | 5/1991 | Sasson et al. | 358/209 |
| 5,040,217 | 8/1991 | Brandenburg et al. | 381/47 |
| 5,109,417 | 4/1992 | Fielder et al. | 381/36 |
| 5,115,240 | 5/1992 | Fujiwara | 341/51 |
| 5,120,387 | 6/1992 | Yoshikawa | 375/122 |
| 5,128,963 | 7/1992 | Akagiri | 375/25 |
| 5,142,656 | 8/1992 | Fielder et al. | 381/37 |
| 5,159,611 | 10/1992 | Tomita et al. | 375/34 |
| 5,185,800 | 2/1993 | Mahieux | 381/29 |
| 5,197,087 | 3/1993 | Iwahashi et al. | 375/122 |
| 5,204,677 | 4/1993 | Akagiri et al. | 341/118 |
| 5,218,561 | 6/1993 | Iwadare | 364/725 |
| 5,222,189 | 6/1993 | Fielder | 395/2 |
| 5,235,671 | 8/1993 | Mazor | 395/2 |
| 5,241,603 | 8/1993 | Akagiri et al. | 381/37 |
| 5,243,588 | 9/1993 | Maeda et al. | 369/54 |
| 5,264,846 | 11/1993 | Oikawa | 341/76 |
| 5,268,685 | 12/1993 | Fujiwara | 341/76 |
| 5,285,476 | 2/1994 | Akagiri et al. | 375/25 |
| 5,294,925 | 3/1994 | Akagiri | 341/50 |
| 5,301,205 | 4/1994 | Tsutsui et al. | 375/1 |
| 5,311,561 | 5/1994 | Akagiri | 375/122 |
| 5,349,549 | 9/1994 | Tsutsui | 364/725 |
| 5,375,189 | 12/1994 | Tsutsui | 395/2.38 |
| 5,381,143 | 1/1995 | Shimoyoshi et al. | 341/51 |
| 5,388,093 | 2/1995 | Yoshida et al. | 369/124 |
| 5,388,209 | 2/1995 | Akagiri et al. | 395/2.38 |
| 5,406,428 | 4/1995 | Suzuki | 360/53 |
| 5,454,011 | 9/1995 | Shimoyoshi | 375/240 |
| 5,461,378 | 10/1995 | Shimoyoshi et al. | 341/51 |
| 5,471,558 | 11/1995 | Tsutsui | 395/2.28 |

FOREIGN PATENT DOCUMENTS

| | | | |
|---|---|---|---|
| 0 458 645 A2 | 11/1991 | European Pat. Off. | H04B 1/66 |
| 0 463 473 A2 | 1/1992 | European Pat. Off. | G06F 15/332 |
| 0 466 190 A2 | 1/1992 | European Pat. Off. | G11B 20/10 |
| 0 473 367 A1 | 3/1992 | European Pat. Off. | H03M 7/30 |
| 0 506 394 A2 | 9/1992 | European Pat. Off. | G10L 7/00 |
| 0525809 | 2/1993 | European Pat. Off. | H04B 1/66 |
| A 01 069 181 | 3/1989 | Japan | H04N 7/137 |
| 6029934 | 2/1994 | Japan | H03M 7/38 |
| 6149292 | 5/1994 | Japan | H03M 7/38 |
| WO90/09064 | 8/1990 | WIPO | H04B 1/66 |
| WO91/16769 | 10/1991 | WIPO | H04B 1/66 |
| WO92/17884 | 10/1992 | WIPO | G11B 20/10 |

OTHER PUBLICATIONS

Digital Coding of Speech in Sub-bands, Crochiere et al., The Bell System Technical Journal, vol. 55, No. 8, Oct. 1976.

An application-specific FFT processor Electronic Engineering, Jun. 1988 pp. 100 and 104–106.

An Application Specific DSP Chip for 100 MHZ Data Rates, Magar et al., IEEE 1988—pp. 1989–1992.

Perceptual Transform Coding of Wideband Stereo Signals, James D. Johnston, ICASSP '89, vol. 3, pp. 1993–1996.

Signal Compression: Technology Targets and Research Directions, Nikil Jayant, IEEE vol. 10, No. 5, pp. 796–818.

Subband/Transform Coding Using Filter Bank Designs Based on Time Domain Aliasing Cancellation, Princen et al., 1987 ICCC, pp. 2161–2164.

FIG.1

EXPLANATION ON CHANGING BLOCK SIZE IN ORTHOGONAL TRANSFORM

BLOCK SIZE FOR ORTHOGONAL TRANSFORM IN LONG MODE

FIG.2(A)

BLOCK SIZE FOR ORTHOGONAL TRANSFORM IN SHORT MODE

HIGH EFFICIENCY ENCODING OR DECODING METHOD AND DEVICE

BACKGROUND OF THE INVENTION

This invention relates to a high efficiency encoding method and device, a high efficiency decoding method and device for encoding input digital data by high efficiency encoding, transmitting, recording, reproducing and decoding the data for producing replay data.

There are a variety of high efficiency encoding methods for audio or voice signals. Typical of these are a sub-band coding (SBC) which is the non-block forming frequency band dividing system consisting in dividing the time-domain signals into signals of plural frequency bands without dividing the time-domain audio signals into plural blocks, and a block-forming frequency band dividing system consisting in dividing time-domain signals into plural blocks, transforming the resulting blocks into frequency-domain signals by orthogonal transform and encoding the resulting frequency-domain signals from one frequency band to another, also known as a transform coding. There is also known a high efficiency encoding consisting in the combination of the sub-band coding and transform coding, in which the time-domain signals are divided into signal of plural frequency bands by the sub-band coding, the signals of the respective bands are orthogonally transformed into frequency-domain signals which are then encoded from one band to another.

A filter employed in the above methods may be exemplified by a quadrature mirror filter (QMF) discussed in 1976 R. E. Crochiere Digital Coding of Speech in Subbands Bell Syst. Tach. J. Vol. 55 No. 8 1976. An equal-band filter dividing method by a polyphase quadrature filter is discussed in ICASSP 83, Boston Polyphase Quadrature Filter—A New Subband Coding Technique, by Joseph H. Rothweiler.

The orthogonal transform may be enumerated by orthogonal transform consisting in forming input audio signals into blocks at an interval of a pre-set unit time period (frame) and processing the resulting blocks with fast Fourier transform (FFT), cosine transform (DCT) or modified DCT (MDCT) for transforming time-domain signals into frequency-domain signals. As for the MDCT, reference is had to ICASSP 1987 Subband/Transform Coding Using Filter Band Designs Based on Time Domain Aliasing Cancellation, J. P. Princen, A. B. Bradley Univ. of Surrey Royal Melbourne Inst. of Tech. The concrete techniques of the MDCT are discussed in detail in our co-pending U.S. Ser. No. 07/950,945 filed on Sept. 24, 1992, now U.S. Pat. No. 5,349,549 .

In quantizing the frequency components, the frequency bands are selected to take into account the characteristics of the human aural sense. That is, the audio signals are divided into a plurality of, for example 25, bands, known as critical bands, in which the bandwidths become broader in a direction of increasing frequencies. In encoding data of the respective frequency bands, a pre-set number of bits are allocated to each band, or variable numbers of bits are allocated to each band by way of adaptive bit allocation. For example, when encoding coefficient data obtained by MDCT by bit allocation, the MDCT coefficient data of the respective bands obtained by block-based MDCT are encoded by adaptive numbers of bits. There are known the following two bit allocation methods.

In IEEE Transactions of Acoustics, Speech, and Signal Processing, vol.ASSP-25, No. 4, August 1977, bit allocation is made based on the magnitudes of the signals of the respective bands. With this system, the quantization noise spectrum becomes flatter and the noise energy becomes minimum. However, the noise as actually perceived by the ear is not optimum because the aural masking effect is not utilized.

In ICASSP 1980 The Critical Band Coder—Digital Encoding of the Perceptual Requirements of the Auditory System, M. A. Kransner MIT, there is discussed a method of producing the signal to noise ratio as required for each band for realizing fixed bit allocation. However, it is not possible with this method to produce a satisfactory characteristic value because the bit allocation remains fixed even for measuring the characteristic with a sine wave input.

With the above-described methods, temporal characteristics, such as time fluctuations of the input information signals, are not taken into account. As a result thereof, the problem of highly jarring pre-echo, which is produced when the input information signals are changed abruptly in amplitude, above all, when small information signals are changed to larger information signals, cannot be solved. By the pre-echo is meant a phenomenon in which the quantization noise produced directly before the small information signal is abruptly changed to the larger information signal is heard without being covered by backward masking to cause deterioration in the sound quality.

As a method of decreasing the pre-echo to a level imperceptible to the ear, the present Applicant has already proposed in U.S. Ser. No. 07/553,608 filed on Jul. 18, 1990, now U.S. Pat. No. 5,197,087, a method consisting in adaptively changing the block length. Specifically, the method consists in sub-dividing a block where there exist acutely changing signals so that there is a high risk of occurrence of pre-echo. Although the pre-echo may be effectively suppressed with this method, pre-echo still exists in the subdivided block portions, albeit to a limited extent.

If bit allocation is made in consideration only of frequency characteristics, it is difficult to avoid the deterioration of the sound quality due to pre-echo during abrupt transition of the information signals. Thus a demand is raised towards a method of effectively preventing the pre-echo from occurring.

OBJECT AND SUMMARY OF THE INVENTION

It is therefore a principal object of the present invention to provide a method for bit allocation which is free from the pre-echo insofar as the human aural sense is concerned.

With the high efficiency encoding device according to the present invention, pre-echo is prevented by preferentially allocating at least a part of the bits that may be used for bit allocation to channels having larger temporal changes of the information signals in dependence upon the temporal changes of the information signals between channels. Detection and decision of the magnitude of temporal changes of the information signals in dependence upon the temporal changes of the scale factor as the normalization information of the frequency components of the information signals is effective for avoiding new arithmetic and logical operations because this parameter forms a part of the sub-data to be transmitted from the encoder to the decoder.

As an alternative method, detection and decision based on the temporal changes of the amplitude information of the sub-blocks on the time scale obtained on further division of the time width of the block having the scale factor is also desirable for performance. Changing the bit allocation not only between channels but also in the channels based on the temporal changes of the signal information between neighboring blocks in the channels is effective in further reducing the pre-echo.

In accordance with the present invention, for resolving the time-domain information signals into frequency-domain signals, a structure in which the output of the non-block forming frequency analysis such as a filter, the output of the block forming frequency analysis, such as orthogonal transform or the output of the non-block forming frequency analysis mapped on the frequency scale by block-forming frequency analysis, such as orthogonal transform, may be employed.

In bit allocation, it is possible to allocate a portion of the bits available for bit allocation as a first bit allocation depending on the information signal spectrum of the respective channels and to employ the remaining bits by appendage to the first bit allocation. Among the appended bits, bit allocation is made for the channels in conformity to the temporal characteristics of the information signals and among the channels. By causing the ratio between the bit allocation conforming to the information signals of the respective channels and the appended bit allocation to depend on the temporal changes of the information signals, it is possible to achieve bit allocation which is further desirable for the sound quality.

If the block size of the orthogonal transform is adaptively changed depending on time characteristics of the information signals, at the same time that the bit allocation is made between the channels, it becomes possible to increase the block length to raise the frequency resolution if the information signal are sub-steady signals, while it is also possible to raise the time resolution to reduce the time of occurrence of pre-echo to prevent the sound quality from being lowered if the information signals are non-steady signals.

The present invention provides a system which is capable of reducing the deterioration in sound quality due to pre-echo likely to be produced in high efficiency encoding and which is convenient for an audio recording and replay of cinema or an audio system which necessitates high sound quality.

DESCRIPTION OF THE PREFERRED EMBODIMENTS

Figure 1:
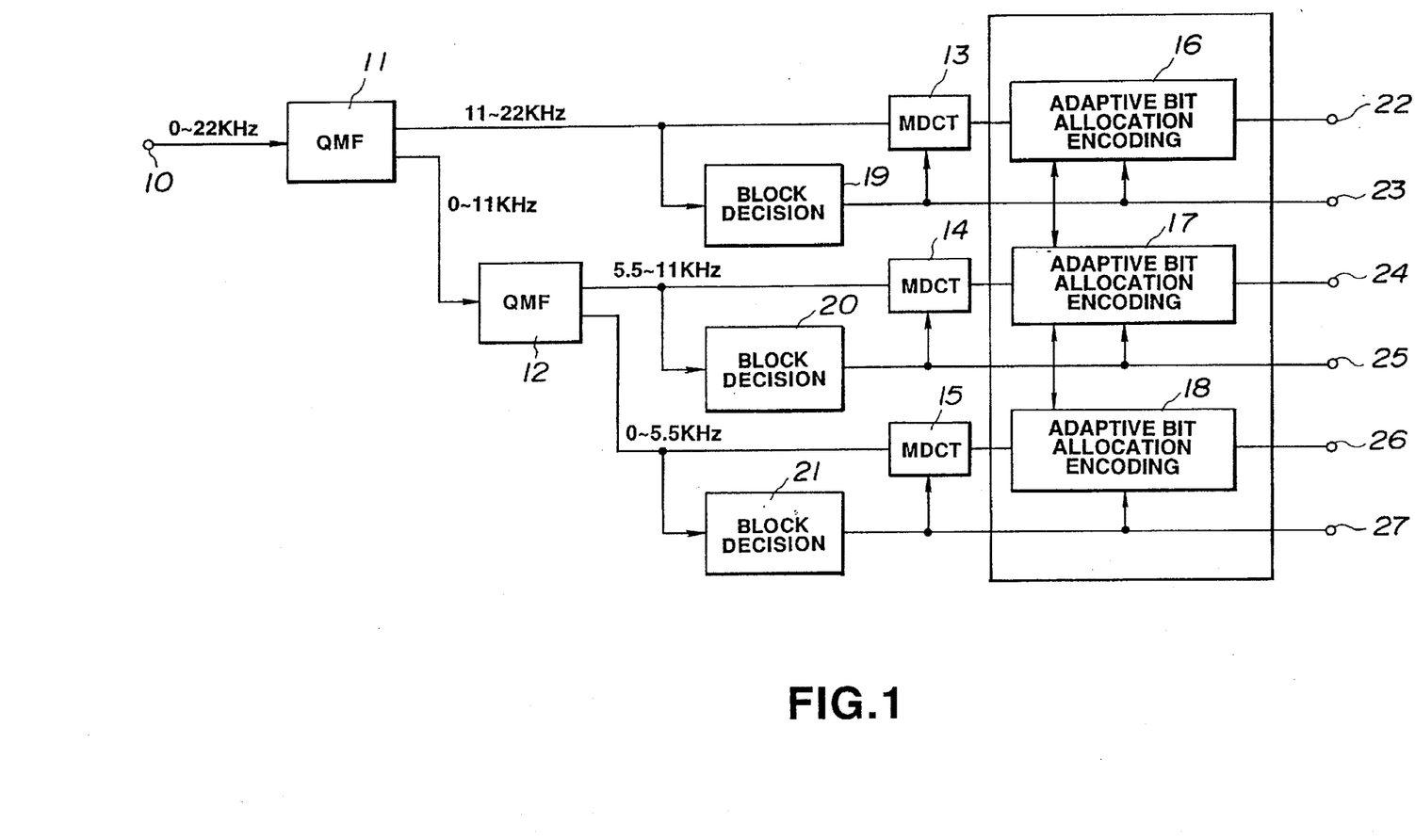
FIG. 1 is a block circuit diagram showing an illustrative arrangement of a high efficiency encoding device according to the present invention.

Referring to FIG. 1, the technique of high efficiency encoding of input digital signals, such as audio PCM signals, by subband coding (SBC), adaptive transform coding (ATC) and adaptive bit allocation (APC-AB), is explained in detail.

In a high efficiency encoding device, shown in FIG. 1, input digital signals are divided by a filter or the like into a plurality of frequency bands and orthogonally transformed from one frequency band to another to produce frequency-domain spectral data which is encoded by adaptive bit allocation on the basis of the critical bands which take into account the characteristics of the human aural sense as later explained. At this time, the critical bands are sub-divided into blocks as the frequency is increased. The frequency bands may naturally be of equal widths in the case of the non-block forming system which is performed with the aid of a filter or the like.

Besides, in the present embodiment, the block size or the block length is adaptively changed prior to orthogonal transform depending on the input signals and a floating operation is performed on the basis of critical bands or of blocks sub-divided from the critical bands for higher frequencies. The critical bands mean the frequency bands which result from frequency division taking into account the characteristics of the human aural sense. That is, the critical band is the band proper to a narrow band noise which masks a pure tone having the same intensity as the noise and the frequency in the vicinity of the noise frequency. The total frequency range of from 0 to 22 kHz is divided into e.g. 25 critical bands which are selected so that the bandwidths become broader towards the higher frequencies. 25 critical bands.

Referring to FIG. 1, audio PCM signals having the frequency range of from 0 to 22 kHz, for example, are supplied to an input terminal 10. The input signals are divided by a band-dividing filter 11, such as a QMF filter, into a band of from 0 to 11 kHz and a band of from 11 to 22 kHz. The frequency band of 0 to 11 kHz is divided by a band-dividing filter 12 into a band of 0 to 5.5 kHz and a band of 5.5 to 112 kHz. The 11 kHz to 22 kHz signal from the filter 11 is supplied to a modified discrete cosine transform (MDCT) circuit 13, as an example of an orthogonal transform circuit, while the 5.5 kHz to 11 kHz signal from the filter 12 is supplied to a modified discrete cosine transform (MDCT) circuit 14 and the 0 kHz to 5.5 kHz signal from the filter 12 is supplied to a modified discrete cosine transform (MDCT) circuit 15 so as to be processed with MDCT.

Figure 2A:
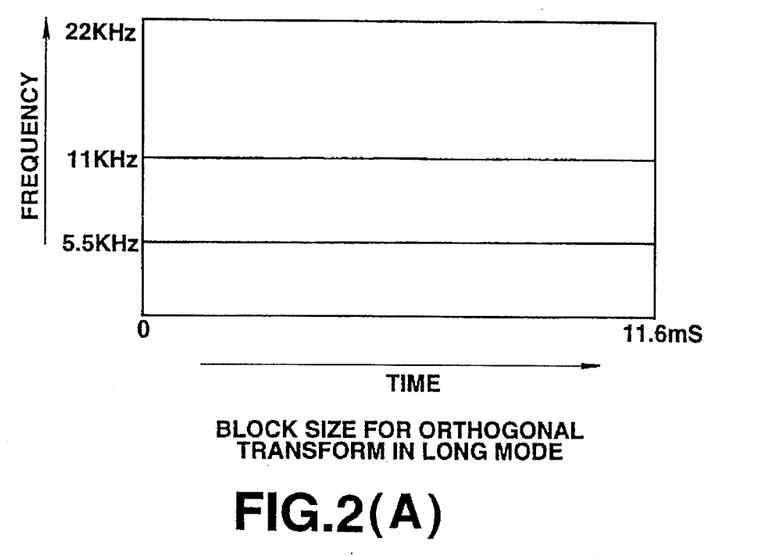
FIGS. 2(A) and 2(B) illustrate the manner employed in the device of FIG. 1 for dividing the signals along the time scale and along the frequency scale.
Figure 2B:
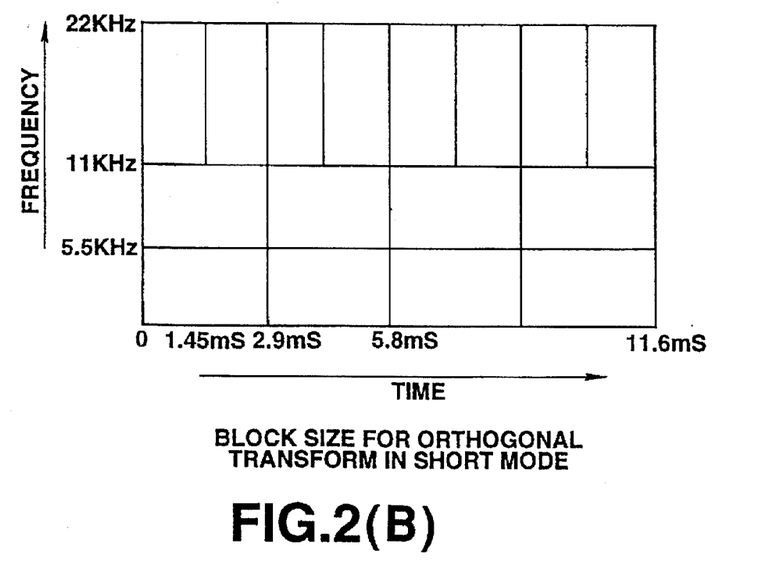

FIGS. 2(A) and 2(B) show a concrete example of a block size for the MDCT circuits 13 to 15. In the concrete example of FIGS. 2(A) and 2(B), each of the three filter outputs has two block sizes for orthogonal transform. That is, for low frequency signals in the frequency band of 0 to 5.5 kHz and mid frequency signals in the frequency band of 5.5 to 11 kHz, each block is made up of 128 samples and 32 samples for the long block size (FIG. 2A) and for the short block size (FIG. 2B), respectively. On the other hand, for high frequency signals in the frequency band of 11 to 22 kHz, each block is made up of 256 samples and 32 samples for the long block size (FIG. 2A) and for the short block size (FIG. 2B), respectively. If the short block size is selected in this manner, the time resolution is increased towards the higher frequency and the number of kinds of the windows employed is decreased, with the number of samples of the orthogonal transform for each band remaining the same.

Returning to FIG. 1, the frequency-domain spectral data or MDCT coefficients, obtained by MDCT by the MDCT circuits 13 to 15 by MDCT, are grouped according to the critical bands or, in a higher frequency range, according to small-sized blocks further divided from the critical bands, and transmitted to adaptive bit allocation encoding circuits 16, 17 and 18. The spectral data or the MDCT coefficient data are re-quantized depending on the number of bits allocated by the adaptive bit allocation encoding circuits 16, 17 and 18 for each of the critical bands or, in a higher frequency range, for each of the small-sized blocks further divided from the critical bands. The data thus encoded are outputted at output terminals 22, 24 and 26. The scale factor indicating which normalization is used as to the signal magnitude and the bit length information indicating which bit length has been used are transmitted simultaneously.

As for the outputs of the MDCT circuits 13 to 15 shown in FIG. 1, the signal energies for the critical bands or those for the small-sized blocks sub-divided from the critical bands are found, such as by computing the roots of squared mean values of the respective amplitude values in the bands. The scale factor itself may naturally be employed for subsequent bit allocation. In such case, new energy computation becomes unnecessary resulting in saving in the hardware scale. The peak or mean values of the amplitude values may naturally be employed in place of the energies for the respective bands.

Figure 3:
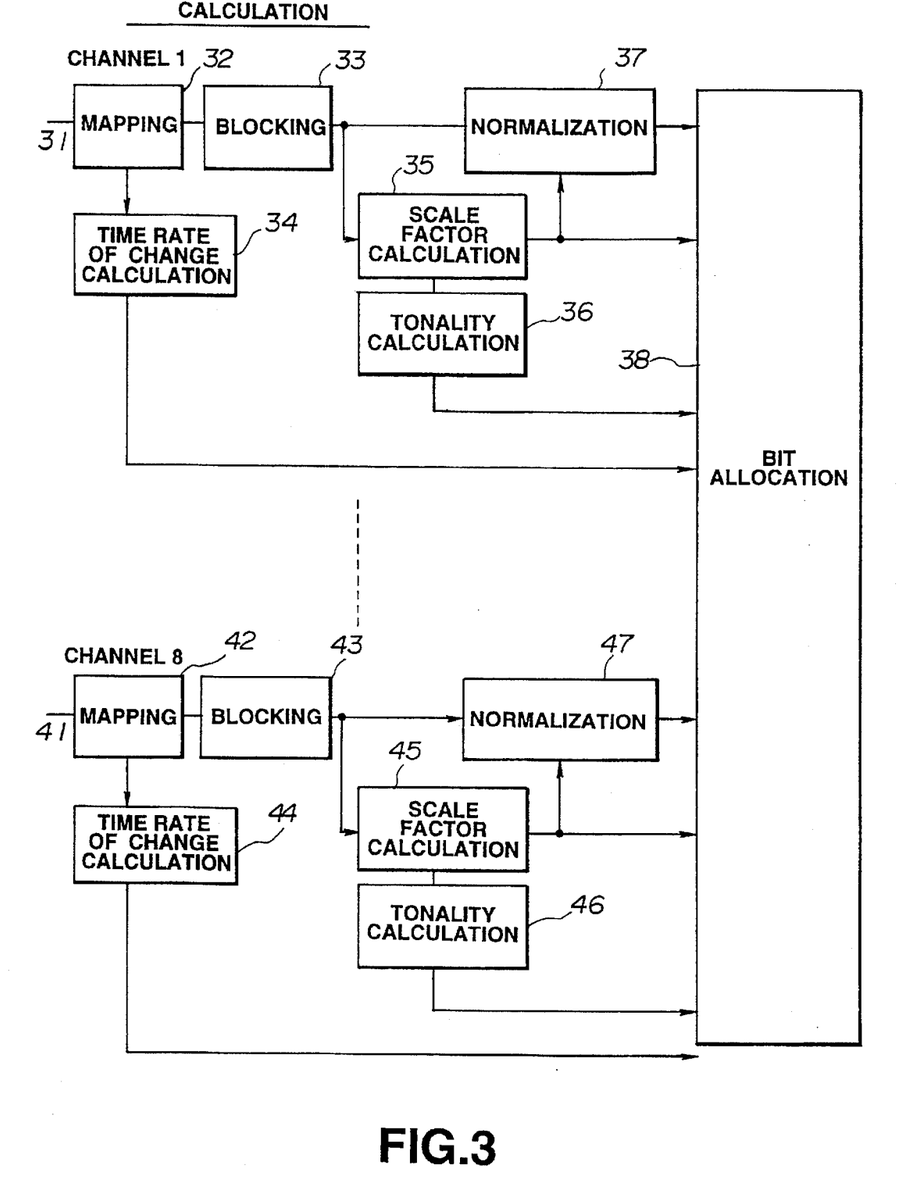
FIG. 3 is a block diagram showing an arrangement for finding multi-channel bit-allocation parameter with the device shown in FIG. 1.
Figure 4:
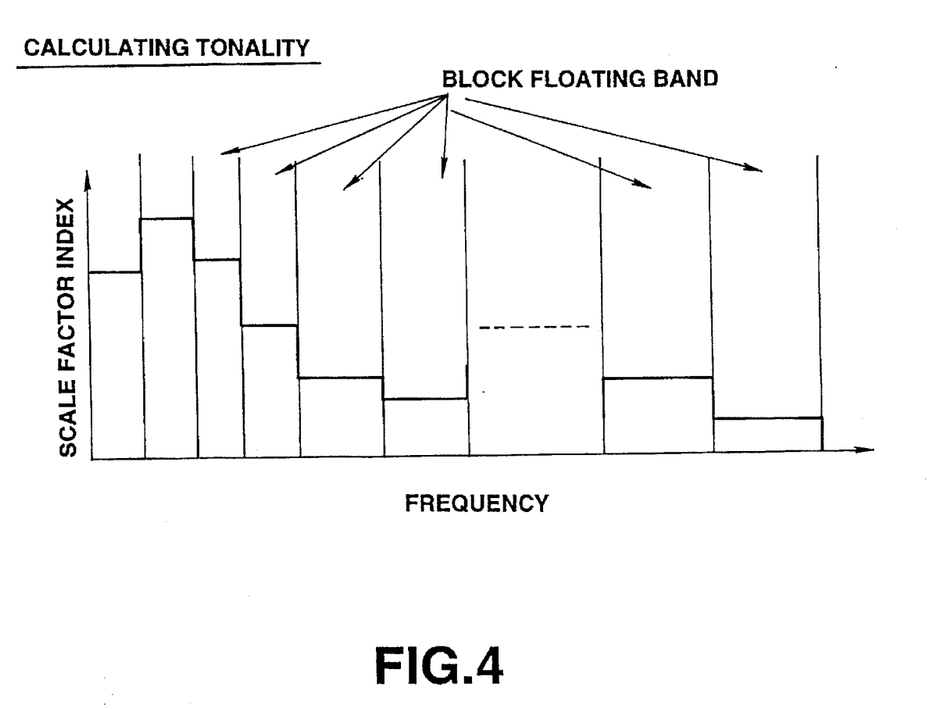
FIG. 4 is a graph showing the manner of finding the tonality.
Figure 5A:
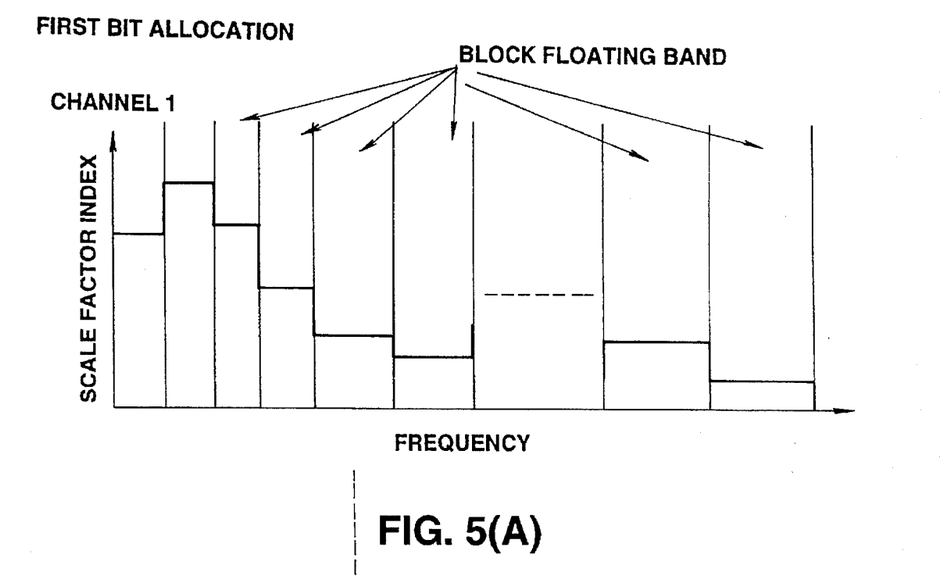
FIGS. 5(A) and 5(B) are graphs showing the manner of first bit allocation.
Figure 5B:
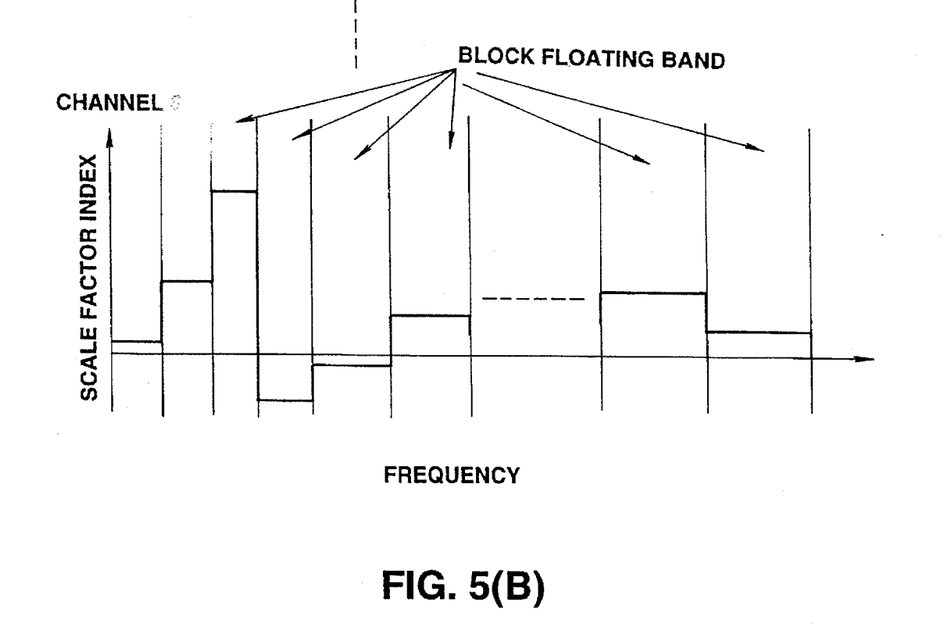

The operation of the adaptive bit allocation circuit is explained by referring to FIG. 3. Although there are eight channels in the present embodiment, only channels 1 and 8 are shown in FIG. 3, while the remaining channels are omitted. The common portions to the channels are explained using the channel 1. Input information signals of the channel 1 are supplied to an input terminal 31. The input information signals are mapped from the time-domain signals on the frequency axis by a mapping function 32. If the filter is employed, the sub-band signals become time-domain samples. In the case of the orthogonal-transformed output, frequency-domain samples are produced. These samples are grouped into sets each consisting of plural samples by a block-forming function 33. If the filter is employed, plural time-domain samples are grouped together, while, in the case of the orthogonal-transformed output, plural frequency-domain samples are grouped together. In the embodiment of FIG. 1, temporal changes of MDCT input time-domain signals during mapping are calculated by a temporal change calculating function 44.

The samples grouped into the blocks each consisting of plural samples by the block-forming function 33 are normalized by a normalizing function 37. The scale factor, a coefficient for normalization, is calculated by a scale factor calculating function 35. From the calculated scale factor, the magnitude of tonality is calculated by a tonality calculating function 36. The parameter found in this manner is employed for bit allocation in a bit allocation function 38. If the number of bits which represents the MDCT coefficient and which is ready to be used for transmission or recording is assumed to be 800 kbps for the entire channels, the number of bits employed for the first bit allocation is determined in the present embodiment.

To this end, among the information concerning the signal spectrum, (a) the information concerning tonality and (b) the information concerning the temporal changes of the signal information, are employed.

Referring first to the information concerning the tonality, the sum of absolute values of the differences between neighboring values of the signal spectral components divided by the number of signal spectral components is employed as an index. More precisely, the mean value of the differences between neighboring scale factor indices of the block-based scale factors for block floating is employed as the index. The scale factor index substantially corresponds to a logarithm of the scale factor. In the present embodiment, the amount of bits to be employed for the first bit allocation is associated with the value indicating the tonality and is set to a maximum value of 600 kbps and a minimum value of 300 kbps.

The tonality is calculated in the following manner.

$$Tm = 1/WLmax(\Sigma ABS(SFn - SFn-1))$$

$$Tav = (1/CH)\Sigma Tm$$

where

Tm = tonality of each channel m = channel number

WLmax = maximum value of word length = 16

Ch = number of channels

Figure 12:
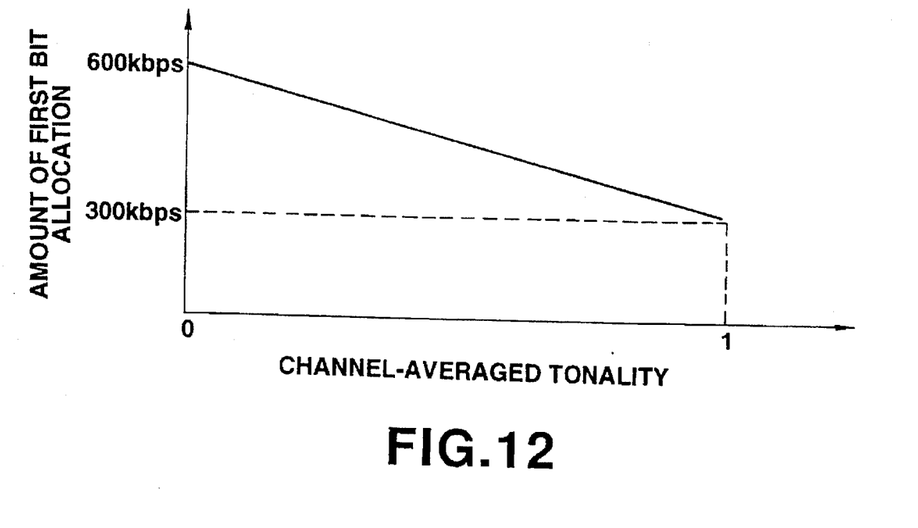
FIG. 12 is a graph showing the relation between the amount of the first bit allocation and channel-averaged tonality.

SFn = scale factor index substantially corresponding to the logarithm of the peak value n: band number for block floating Tav: channel-averaged tonality The value of Tar found in this manner is associated with the first amount of bit allocation as shown in FIG. 12.

In the present embodiment, the proportion of distribution between allocation to the first bit allocation pattern and at least one other bit allocation to be appended thereto depends on the characteristics of temporal changes of the information signals. In the present embodiment, the time area in which the information signal amplitudes become abruptly larger is detected by comparing the peak values of the signal information for adjacent blocks for each time domain divided from the time block size for orthogonal transform to determine the proportion of distribution.

The temporal rate of change is calculated in the following manner.

$$Vt = \Sigma Vm$$

$$Vav = (1/Vmax)*(1/Ch)Vt$$

where

Figure 13:
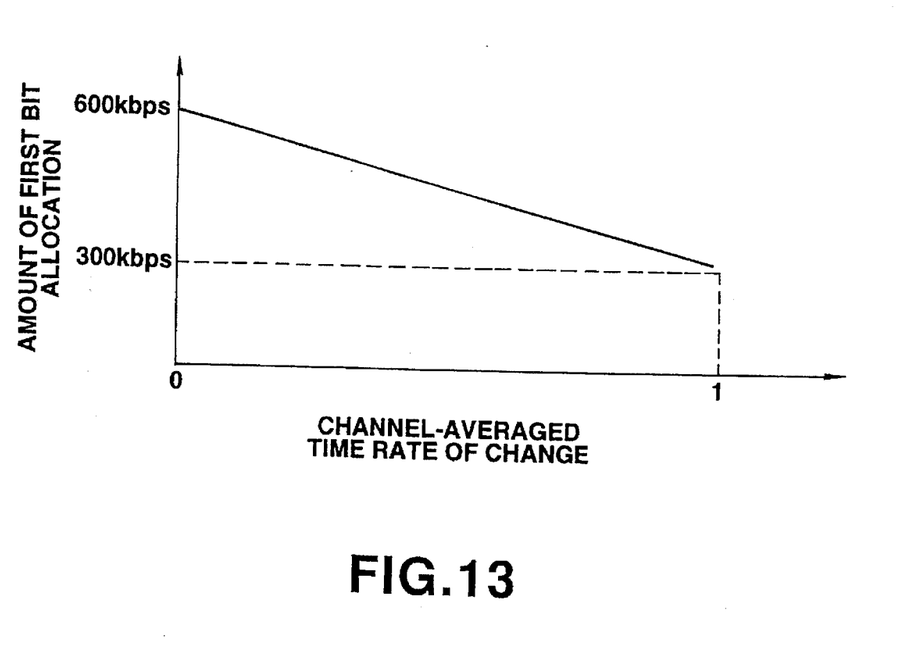
FIG. 13 is a graph showing the relation between the amount of the first bit allocation and channel-averaged time rate of change.

Vt: the sum for each channel of changes of the peak value of the time sub-block of each channel from a smaller value to a larger value, expressed in db Vm: the magnitude of the largest one of the changes of the peak value of the time sub-block of each channel from a smaller value to a larger value, expressed in db, with the maximum value being limited to 30 db and expressed as Vmax m: channel number Ch: number of channels Vab: channel-averaged changes of the peak value of the time sub-block of each channel from a smaller value to a larger value, expressed in db The value of Vav found in this manner is associated with the amount of the first bit allocation as shown in FIG. 13.

Ultimately, the amount of the first bit allocation is found by the following equation:

$$B = \tfrac{1}{2}(Bf + Bt)$$

where

B: ultimate value of the first bit allocation

Bf: the mount of bit allocation as found from Tav

Bt: the mount of bit allocation as found from Vav

After the amount of bits employed for the first bit allocation is determined in this manner, bit allocation is made for each channel for the first bit allocation.

Various selection may be made depending on the signal properties. Adaptive bit allocation may naturally be made depending on the distribution of the scale factor on the frequency scale. In this case, effective bit allocation may be made by bit allocation between the channels depending on the distribution of the scale factor on the frequency scale for the totality of channels. In this case, if the signal information of plural channels is mixed in the same sound field to reach left and right ears as in the case of speakers, it may be assumed that effective masking is made by the mixed signals of the totality of the channels. Therefore, it is effective to perform bit allocation so that the same noise level is achieved for the respective channels. To this end, it suffices to perform bit allocation in proportion to the magnitude of the scale factor indices.

$$Bm = B * \Sigma SFn / S$$

$$S = \Sigma(\Sigma SFn)$$

where

Bm: the amount of first bit allocation for each channel

B: the amount of first bit allocation for totality of channels

SFn=scale factor index substantially corresponding to the logarithm of the peak value n=band number of block floating m=channel number S=sum of indices of scale factors of the totality of channels Then, allocation of bits not employed in the first bit allocation is carried out. Various bit allocations are carried out herein.

(1) Uniform allocation for the totality of sample values

Figure 6:
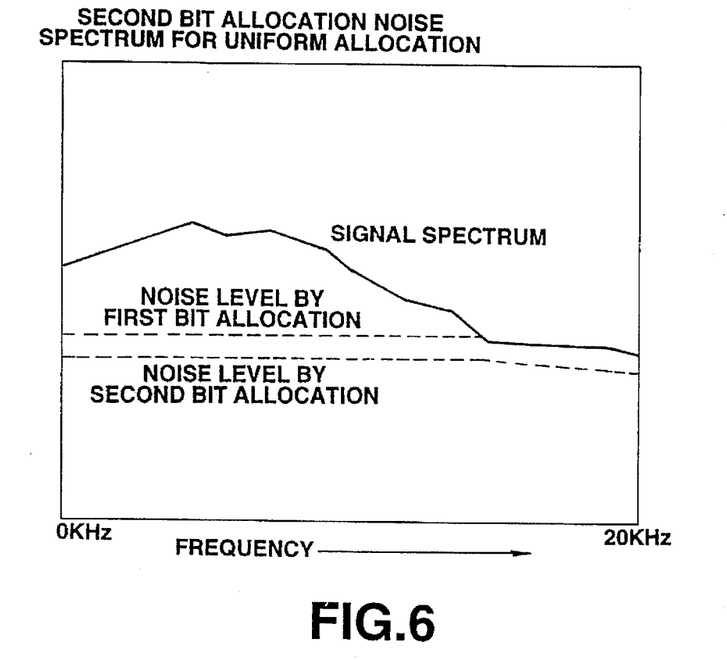
FIG. 6 is a graph showing the noise spectrum in the case of uniform allocation in the first bit allocation.

The quantization noise spectrum for the bit allocation in this case is shown in FIG. 6. Uniform noise level reduction may be made for the totality of the frequency bands.

Figure 7:
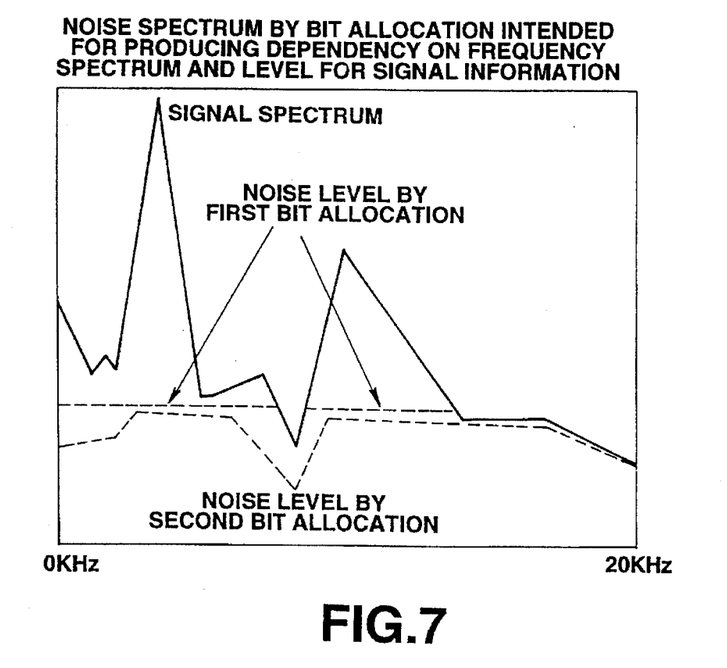
FIG. 7 is a graph showing an example of a noise spectrum by bit allocation for producing aural effects exhibiting the dependency on the signal level and the dependency on the frequency spectrum of information signals.

(2) Bit allocation for realizing aural effects exhibiting the dependency on the signal level and the frequency spectrum of the signal information An exemplary quantization noise spectrum for the bit allocation in this case is shown in FIG. 7. In the present case, bit allocation is performed in dependence upon the spectrum of the information signals. In particular, bit allocation is performed so as to place emphasis on the low frequency side of the information signal spectrum to compensate for decreased masking effects on the low frequency side which occurs more pronouncedly than on the high frequency side. This is based on the non-symmetry of a masking curve which places emphasis on the low frequency of the signal spectrum to take account of the masking between neighboring critical bands.

Figure 8:
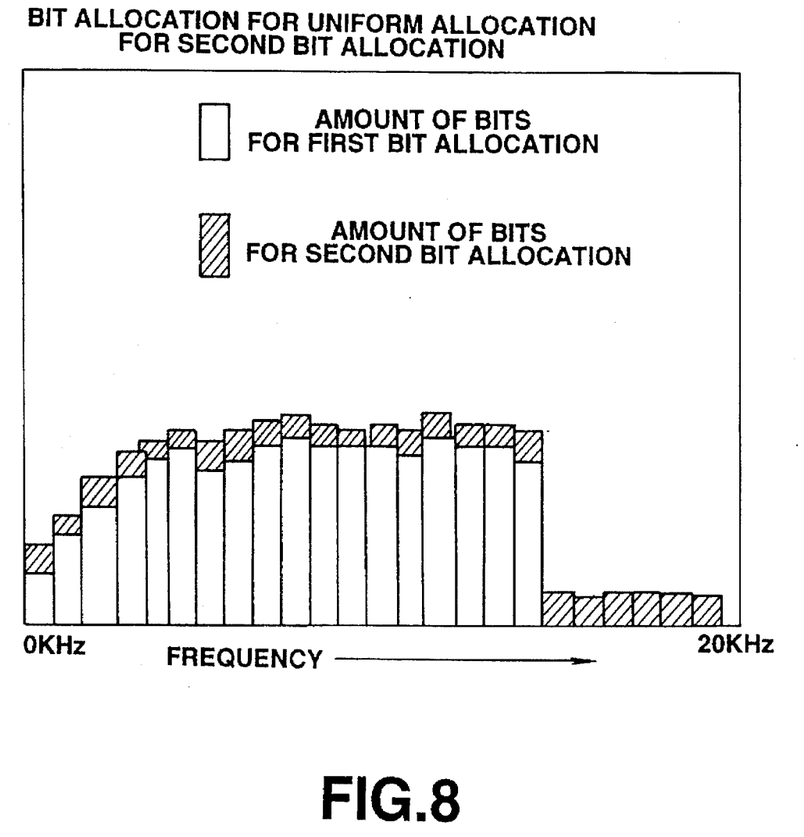
FIG. 8 is a graph showing the noise spectrum in the case of uniform allocation in the second bit allocation.
Figure 9:
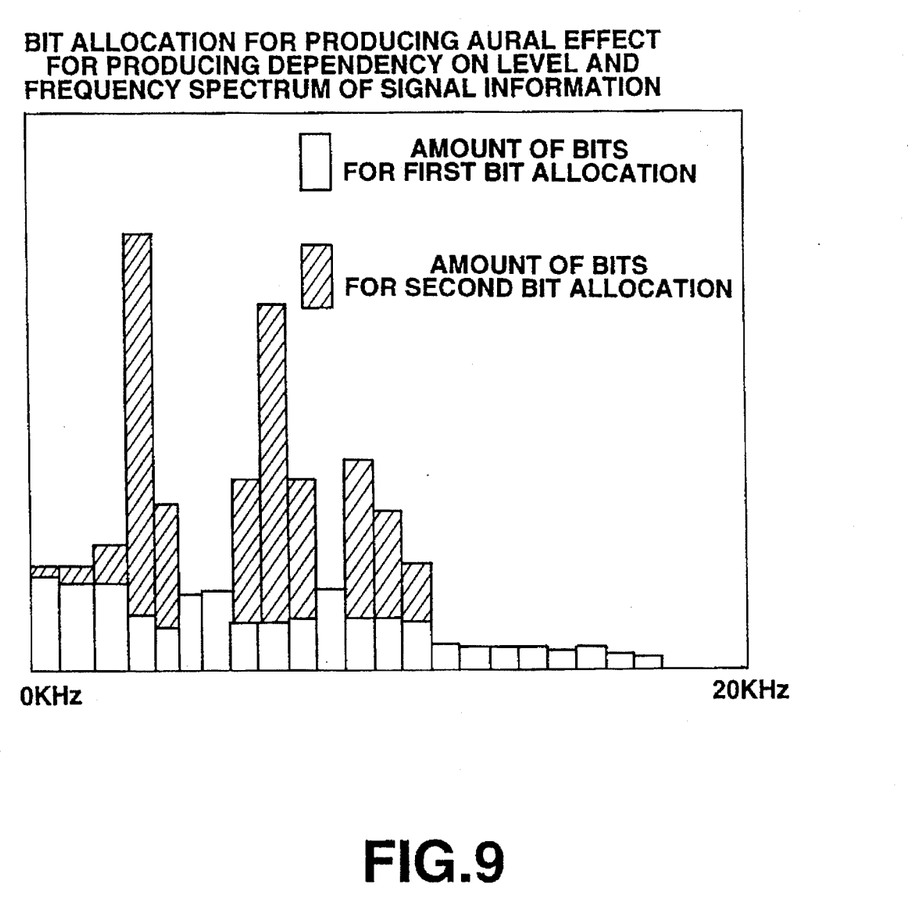
FIG. 9 is a graph showing an example of bit allocation for producing aural effects exhibiting the dependency on the signal level and the dependency on the frequency spectrum of information signals.

FIGS. 8 and 9 illustrate the manner of bit allocation. In the case of low-tonality input signals where the signal spectrum is smooth over the entire frequency range, more bits are allocated to the first bit allocation as shown in FIG. 8. Conversely, in the case of high tonality input signals, the amount of bits is decreased for the first bit allocation, as shown in FIG. 9, whereas the amount of bits for the second bit allocation is increased, as shown in FIG. 9, so that more bits are allocated to the signal spectrum having a larger level.

In FIGS. 7 and 9, second bit allocation is set so as to place emphasis on the low frequency side. In the present embodiment, there are a variety of patterns of bit allocation in which the amounts of bits of blocks of shorter time duration are distributed for the respective frequencies. In the present embodiment, above all, plural patterns of bit allocation are provided in which the rates of bit allocation are different for the mid to low frequency range and the high frequency range. Such a pattern is selected in which the smaller the signal magnitude, the lesser is the amount of bit allocation to the higher frequency side. In this manner, it becomes possible to take advantage of the loudness effects in which the sensitivity for the higher frequency is lowered for a smaller signal magnitude. Although the signal magnitude of the entire frequency range may be employed at this time for the signal magnitude, an output of a non-block forming frequency dividing circuit employing a filter or an MDCT output is utilized. Ultimately, the sum of the first bit allocation and the bit allocation annexed to the first bit allocation is found by a bit allocation function 38 shown in FIG. 3.

The present invention comprises, in addition to the above, a process of detecting the temporal change characteristics of the signals of the respective channels to change the amounts of bit allocation for the respective channels. An index representative of the temporal changes is found in the following manner.

Figure 10:
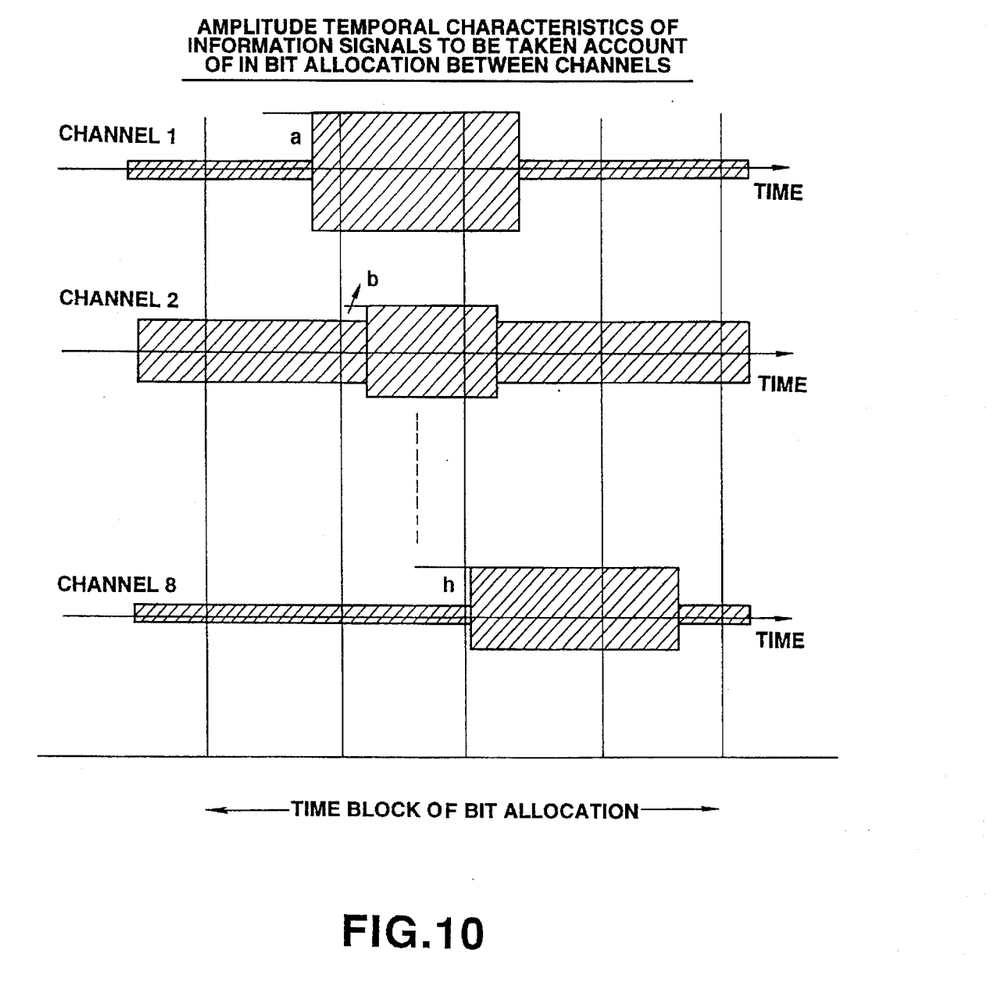
FIG. 10 shows the manner of finding a parameter for bit allocation which takes into account the temporal characteristics of the information signals between channels.

If there are eight channels as shown in FIG. 10, the bit allocating time blocks, as time units of bit allocation of the information input signals of the respective channels, are temporally divided into four sub-blocks for each of which the peak value is found. The bits are distributed between the channels depending on the magnitude of the differences of the peak values of the sub-blocks which are changed from a smaller value to a larger value. If a sum total of C bits are available for bit allocation for the eight channels, and the differences of the peak values of the sub-blocks changed from a smaller value to a larger value are expressed as a, b, c, d, e, f, g and h db, bit allocation may be made by $C*a/T$, $C*b/T$, ... $C*h/T$ bits, where $T = a+b+c+d+e+f+g+h$. The larger the rate of increase of the signal information the more the number of bits allocated to the channels. The ultimate bit allocation is made as the sum of the bits of the above-mentioned bit allocations.

Besides, if the number of bits that may be used for each bit allocation is equal to C, it is possible to provide t bits as a countermeasure for the pre-echo. That is, if the C-t bits are the number of bits that may be used in the eight channels, and the magnitude of the differences of the peak values of the respective sub-blocks of each channel are expressed as a, b, c, d, e, f, g and h db, the bit allocation may be made by $(C-t)*a/T$, $(C-t)*b/T$, ... $(C-t)*h/T$ bits.

For one of the channels in which the pre-echo is of a maximum value, that is in which there exists the maximum value among a, b, c, d, e, f, g and h, the t-bits are allocated preferentially. Consequently, more t-bits are allocated to this channel so that pre-echo may be decreased significantly. In particular, when the present technique is used for a sound track of a cinefilm, in which main forward signals FR FL is critical, the t-bits may be allocated to one of them. Alternatively, the t-bits may be allocated to a woofer channel.

Figure 11:
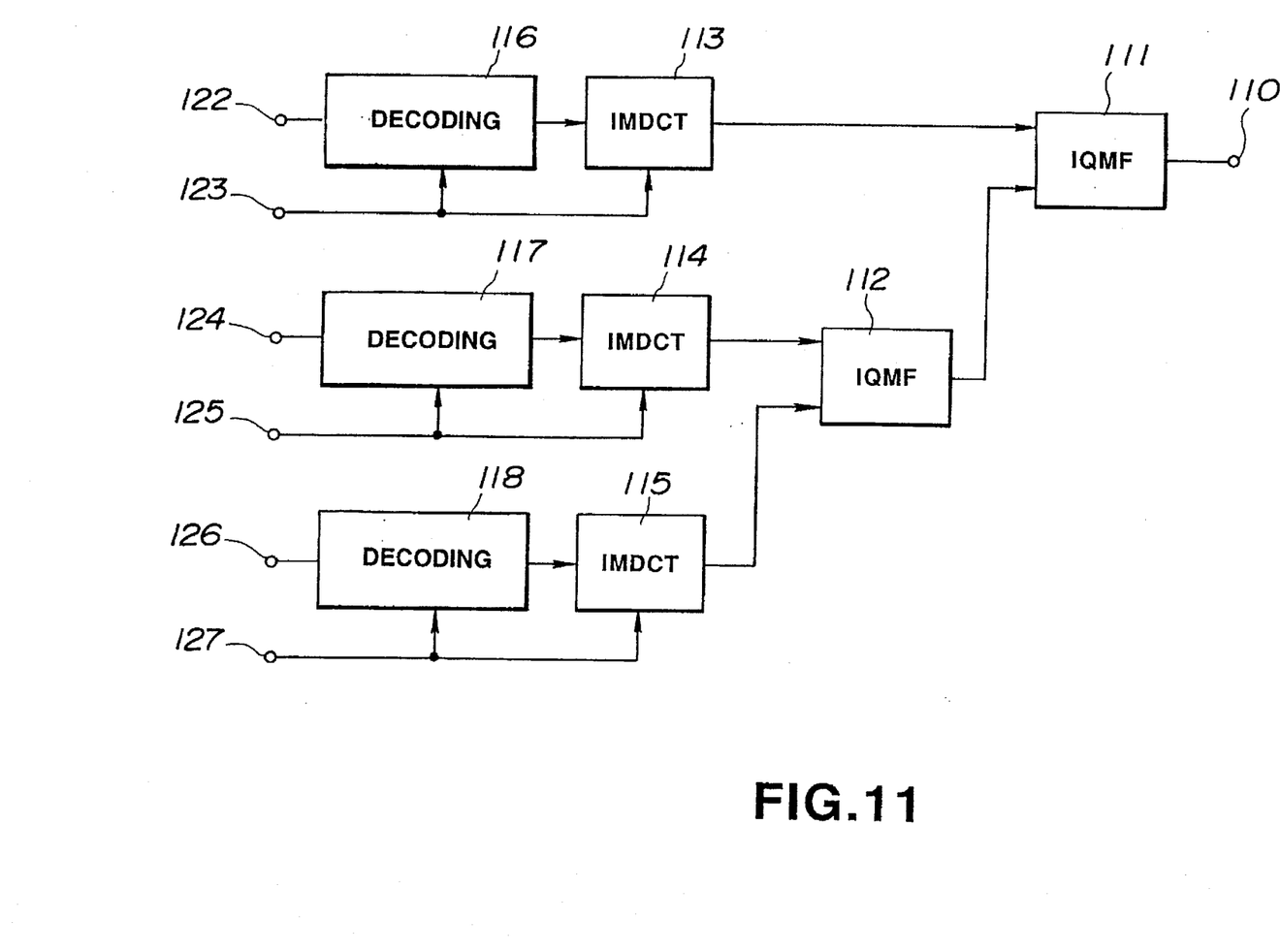
FIG. 11 is a block circuit diagram showing an illustrative arrangement of a high efficiency decoding device according to the present invention.

FIG. 11 shows a decoding circuit for decoding the high-efficiency coded signals. The quantized MDCT coefficients for the respective bands are supplied to inputs of the decoding circuit 122, 124 and 126, while the block size information employed is supplied to inputs 123, 125 and 127. The decoding circuits 116, 117 and 118 release bit allocation using the adaptive bit allocation information. In the MDCT circuits 113, 114 and 115, the frequency domain signals are transformed into time-domain signals. The time-domain signals of the partial range are decoded by the IQMF circuit into the entire range signals.

It will be seen from above that the present invention provided a method of bit allocation which is aurally desirable for compression of temporally fluctuated information signals in a multi-channel system.

What is claimed is:

1. A method of encoding, digital information signals of plural channels comprising the steps of:
    allocating to each of the plural channels, from a totality of bits, a respective number of bits as a first bit allocation, each respective first bit allocation based upon an information signal spectrum of a respective channel; and
    allocating to at least one of the plural channels, from the totality of bits, an additional number of bits as a second bit allocation, each respective second bit allocation based upon temporal changes of an energy value of the digital information signals in at least one of the plural channels.

2. The method of encoding as claimed in claim 1, wherein said energy value is at least one of an amplitude information, a peak value and a mean value.

3. The method of encoding as claimed in claim 1, wherein the amounts of the second bit allocation among the plural channels are controlled depending on the temporal changes of the scale factor of the respective channels.

4. The method of encoding as claimed in claim 3, wherein the amounts of the second bit allocation among the channels are controlled depending on the temporal changes of the scale factor of the respective channels and temporal changes of the word lengths caused by bit allocation among the channels.

5. The method of encoding as claimed in claim 1, wherein the amounts of the second bit allocation among the channels are controlled depending on the temporal changes of the amplitude information of temporally neighboring plural blocks for the respective channels.

6. The method of encoding as claimed in claim 1, wherein the totality of bits employed for bit allocation is divided into the first bit allocation which depends on a pattern of indices indicating a signal magnitude in small blocks obtained by sub-division with respect to time and frequency and at least one second bit allocation for aural effects, the second bit allocation appended to said first bit allocation.

7. The method of encoding as claimed in claim 6, wherein a ratio of distribution between said first bit allocations and the at least one second bit allocation is adaptively controlled depending on the digital information signals.

8. The method of encoding as claimed in claim 7, wherein said ratio of distribution is controlled so that the greater the temporal changes in said digital information signals, the lesser the ratio of distribution for said first bit allocation becomes.

9. The method of encoding as claimed in claim 1, 2, 3, 4, 5, 6, 7 or 8, wherein an output of a non-block forming frequency analysis is analyzed by block-forming frequency analysis for producing samples in small blocks obtained by subdivision with respect to time and frequency.

10. The method of encoding as claimed in claim 9, wherein a block size for said block-forming frequency analysis is adaptively changed depending on temporal characteristics of the digital information signals of the respective channels.

11. The method of encoding as claimed in claim 10, wherein said block size is changed independently for each of at least two output bands of the non-block forming frequency analysis.

12. The method of encoding as claimed in claim 1, 2, 3, 4, 5, 6, 7 or 8, wherein the encoded digital information signals are recorded on a recording medium.

13. The method of encoding as claimed in claim 12, wherein said recording medium is at least one of a cinefilm, an optical disc, a magnetic tape and a magneto-optical disc.

14. A recording medium on which recording is made by the high efficiency encoding recording method as claimed in claim 13.

15. The method of encoding as claimed in claim 12, wherein said recording medium is at least one of a cinefilm, an optical disc, a magnetic tape and a magneto-optical disc.

16. The method of encoding as claimed in claim 1, 2, 3, 4, 5, 6, 7 or 8, wherein the encoded digital information signals are transmitted on a transmission channel.

17. The method of encoding as claimed in claim 16, wherein said transmission channel is a digital information transmission channel.

18. A high efficiency decoding method for decoding encoded information signals, comprising the steps of:
    separately decoding the encoded information signals for each of the plural channels using respective block size information and respective bit allocation information for each of the plural channels to output frequency domain signals, the encoded information signals obtained on the basis of allocated bits, wherein from a totality of bits a pre-set bit allocation is made for digital information signals of plural channels, and wherein an additional bit allocation among the channels is based on temporal changes of an energy value of the information signals of at least one of the respective channels; and
    orthogonally transforming the frequency domain signals into time-domain signals.

19. A high efficiency decoding device for decoding encoded information signals obtained on the basis of allocated bits, where a pre-set bit allocation is made for digital information signals of plural channels, wherein the bit allocation among the channels is based on temporal changes of an energy value of the information signals of the respective channels, comprising:
    means for separately decoding the encoded information signals for each of the plural channels using respective block size information and respective bit allocation information for each of the plural channels to output frequency domain signals, the encoded information signals obtained on the basis of allocated bits, wherein from a totality of bits a pre-set bit allocation is made for digital information signals of plural channels, and wherein an additional bit allocation among the channels is based on temporal changes of an energy value of the information signals of at least one of the respective channels; and
    means for orthogonally transforming the frequency domain signals into time-domain signals.

20. A high efficiency decoding device for decoding encoded information signals, comprising:

a plurality of decoders for separately decoding the encoded information signals for each of the plural channels using respective block size information and respective bit allocation information for each of the plural channels to output frequency domain signals, the encoded information signals obtained on the basis of allocated bits, wherein from a totality of bits a pre-set bit allocation is made for digital information signals of plural channels, and wherein an additional bit allocation among the channels is based on temporal changes of an energy value of the information signals of at least one of the respective channels; and a plurality of orthogonal transformers for orthogonally transforming the frequency domain signals into time-domain signals.

* * * * *